United States Patent

[15] 3,644,816

Gilbert

[45] Feb. 22, 1972

[54] MANUAL AND AUTOMATIC MASTER-SLAVE CONTROL SYSTEM

[72] Inventor: Kendall E. Gilbert, Schenectady, N.Y.

[73] Assignee: General Electric Company

[22] Filed: Dec. 21, 1970

[21] Appl. No.: 99,787

[52] U.S. Cl. ........................... 318/663, 318/675, 318/676
[51] Int. Cl. ........................................................ G05b 1/06
[58] Field of Search ............... 318/674, 675, 676, 663, 667, 318/162

[56] References Cited

UNITED STATES PATENTS

| | | | |
|---|---|---|---|
| 3,060,359 | 10/1962 | Schebler | 318/667 X |
| 3,405,336 | 10/1968 | Davidoff | 318/663 X |
| 3,454,855 | 7/1969 | Morlen | 318/675 |

*Primary Examiner*—Benjamin Dobeck
*Attorney*—Paul A. Frank, John F. Ahern, Julius J. Zaskalicky, Louis A. Moucha, Frank L. Neuhauser, Oscar B. Waddell and Joseph B. Forman

[57] ABSTRACT

A control system including a slave member and a master member for maintaining the slave member in alignment with the master member in response to the movements thereof. Means are provided for moving the slave member through a cycle of automatic operation starting from a position of alignment with the master member and returning to a position of alignment with the master member thereby facilitating transferring of the system from manual to automatic control and return.

4 Claims, 5 Drawing Figures

INVENTOR
KENDALL E. GILBERT

INVENTOR
KENDALL E. GILBERT
HIS ATTORNEY

MANUAL AND AUTOMATIC MASTER-SLAVE CONTROL SYSTEM

The present invention relates in general to material-handling apparatus or manipulators of the kind in which the movements of a control or master member produces corresponding movements amplified in respect to the force exerted thereby of a controlled or slave member and in particular relates to apparatus provided with capability to move the slave member automatically through a cycle of operation while the master member is maintained fixed in position.

In apparatus of the kind described herein which is capable of both manual and automatic operation, when there is a switch from manual to automatic control and a return to manual control, it is desirable that the spatial orientation of the slave boom at the time of return to manual control be the same as it was at the time it was put into the automatic operation. This assures that the automatic cycle will not return the boom to an unsafe position, for example, one that might encounter obstacles. Also, it will be appreciated that the slave position at the start of automatic control to which the slave returns at the completion of automatic control is determined by the operator to suit the task at hand, and achieved by manual control.

The present invention is directed to the provision of means for switching such a system from manual to automatic and return without any deleterious effects.

In carrying out the present invention in accordance with an illustrative embodiment thereof, there is provided a master member to which is coupled an electromechanical transducer providing a first electrical signal in accordance with the change in orientation of the master member. A slave member is also provided to which is coupled a slave electromechanical transducer providing a second electrical signal output which varies in accordance with the orientation of the slave member. Means are provided for differentially combining the first and second signals from the transducers and applying the combined signal to the input of an amplification channel. In response to the output of the amplification channel, the slave actuator is driven to move the slave member into correspondence with the master member. Further means are provided for developing one cycle of a third electrical signal. Means are provided for additively combining the first electrical signal and the third electrical signal whereby while the master member is maintained fixed, the slave member moves in a cycle of operation corresponding to one cycle of the third signal and returns to a position of alignment with the master member.

The novel features which are believed to be characteristic of the present invention are set forth in the appended claims.

The invention itself, however, together with further objects and advantages thereof may best be understood by reference to the following description taken in connection with the accompanying drawings wherein.

Figure 1:
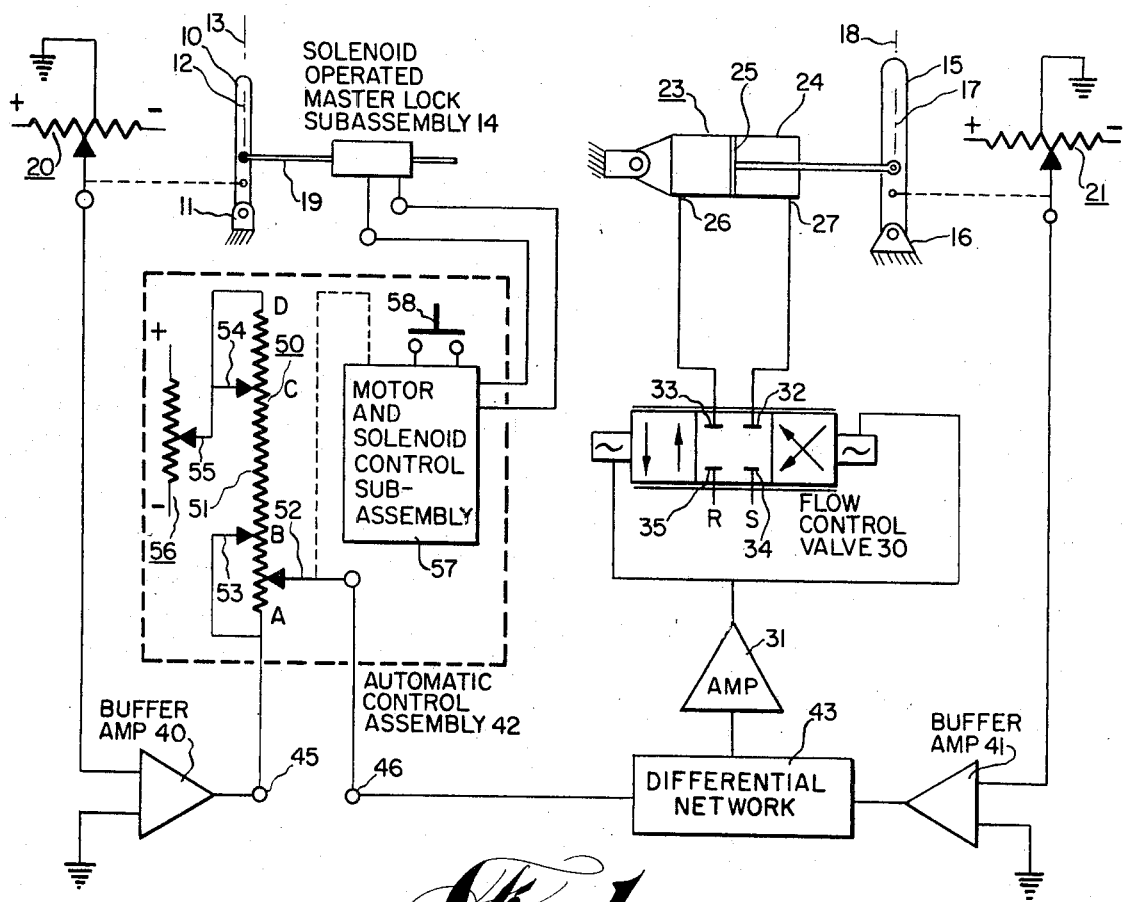
FIG. 1 is a schematic diagram of the system in accordance with the present invention.

Referring now to FIG. 1, there is shown a master member 10 pivoted at one end thereof about a master support member 11 or ground. The longitudinal axis 12 of the master member is aligned along a predetermined axis 13. Also shown is a master lock subassembly 14 which is solenoid operated to hold one end of a guide rod 19 fixed therein, the other end of said guide rod being pivotally connected to the master member 10. Accordingly, in response to energization of the solenoid, of the master lock subassembly, the master member is locked in position. Also shown is a slave member 15, one end of which is mounted to a slave support member 16 or ground, and the other end of which is adapted to apply force and torque to objects. The longitudinal axis 17 of the slave member is aligned along a predetermined axis 18. Also provided are a master electromechanical transducer 20, a slave electromechanical transducer 21 and a slave linear actuator 23. The master electromechanical transducer 20, which may be a potentiometer, is mechanically coupled to the master member 10 to produce an electrical output in accordance with the change in orientation of the axis 12 of the master member 10 in relation to the predetermined axis 13. The slave electromechanical transducer 27 which also may be a potentiometer is mechanically coupled to the slave member 15 to produce an electrical output in accordance with a change in orientation of the axis 17 of the slave member in relation to the other predetermined axis 18. Outputs from the slave transducer 21 and from the master transducer 20 are matched such that the output from the master transducer corresponding to a predetermined displacement of the axis 12 of the master member from the one predetermined axis 13 is equal to the output from the slave transducer corresponding to the same predetermined displacement of the axis 17 of the slave member from the other predetermined axis 18. The slave actuator 23 includes a cylinder 24 and a piston 25 movable therein, a pair of ports 26 and 27, one at each end of the cylinder 24 for providing fluid to the ends of the cylinder to cause the piston 25 to move in one direction or the other depending upon the pressure differential applied to the ports. The piston 25 of the slave actuator is pivotally connected to the slave member 15 intermediate the ends thereof and the cylinder 24 is pivotally connected to ground or the support member 28. Accordingly, the application of a fluid pressure differential between the ends of the cylinder causes the slave member 15 to move about its ground support 16.

A fluid flow control valve 30 and a current amplifier 31 which constitute a signal amplification channel provide a pressure differential at the output thereof in response to a difference in signals from the electromechanical transducers 20 and 21. The pressure differential is applied to the slave actuator 23. The electrohydraulic flow control servo valve 30 includes a current input circuit which is connected to the output circuit of the amplifier 31 and a pair of fluid output ports 32 and 33. A pressure source port 34 and a fluid return port 35 are also provided and are adapted to be connected respectively to a pressure source S and a fluid return R therefor. The valve 40 provides a flow or pressure output the magnitude and direction of which at the output ports thereof is a function of the magnitude and direction of the current applied to the input circuit of the control valve 40.

The output from the master electromechanical transducer 20 is applied to a buffer or follower amplifier 40 and similarly the output of the slave electromechanical transducer 21 is applied to a buffer or follower amplifier 41. The buffer amplifiers provide isolation in between the electromechanical transducers and the subsequent circuits of the system and avoids overloading of the input sources, namely the electromechanical transducers 20 and 21. The output of the buffer amplifier 40 is applied through the automatic control assembly 42 to one input terminal of a differential network 43 and the output of the other buffer amplifier 41 is applied to another input terminal of the differential network 43 which develops an output, the magnitude and direction of which corresponds to the magnitude and direction of displacement of the slave member 10 with respect to the master member 15. The output of the differential network is applied to the amplifier 31 and in turn the output of the amplifier is applied to the current coils of the control valve 30 to develop a displacement in the valve which produces a fluid flow at the output ports thereof which corresponds in magnitude and direction to the input current applied to the valve. Of course, it will be appreciated by those skilled in the art that in many cases, especially in high-gain servosystems, stabilization is necessary and to this end a pressure feedback signal may be provided. Such pressure feedback signal may be obtained from a pressure transducer (not shown) which may be connected across the output ports of the valve 30 and may be applied through an amplifier to the current amplifier.

The automatic control assembly 42 includes an input terminal 45 and an output terminal 46. The output of the buffer amplifier 40 is connected to the input terminal 45 and the output terminal 46 is connected to the input of the differential network 43. Accordingly, the signal developed between the input and output terminals 45 and 46 of the automatic control assembly is applied in series with the output of the buffer amplifier 40 to the differential network. The automatic control assembly also includes a potentiometer or rheostat 50 having a resistive element 51 and a conductive wiper arm 52 movable along the length thereof. At the lower end of the resistive element 51 is included a trimmer tap 53 which is slidable therealong and provides a short between the lower end and the point of contact of the tap with the resistive element. Similarly, the upper end of the resistive element 51 is provided with a trimmer tap 54 which electrically shorts the upper end of the element 51 to the point of contact with the resistive element 51. The lower end of the resistive element 51 is connected to the input terminal 45 and the upper end of the resistive element is connected to an adjustable tap 55 on a voltage divider 56. The wiper arm 52 of the rheostat is mechanically coupled to a motor in the subassembly 57, to be described in connection with FIG. 5, which is programmed to cycle the wiper arm 52 from the lower end to the upper end and return, and accordingly produces a signal between the input terminal 45 and the output terminal 46 which starts at a predetermined level corresponding to the potential of terminal 45, attains its maximum value at the upper end of the rheostat and returns to the initial level at the termination of the cycle.

Figure 2:
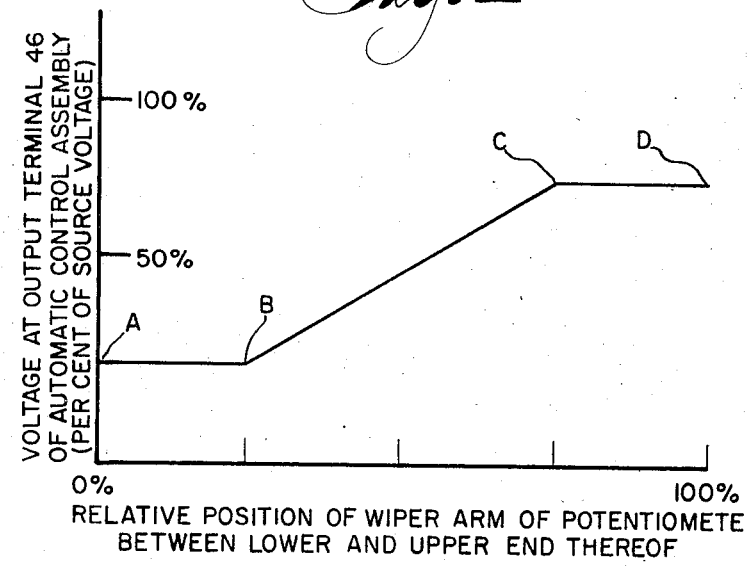
FIG. 2 is a graph of one-half of a cycle of an electrical signal used to drive the slave member through a cycle of automatic operation.

For the particular configuration shown in FIG. 1, one-half of the cycle of operation is shown in the graph of FIG. 2 in which the ordinate represents voltage appearing at the output terminal 46 of the automatic control assembly and the abscissa represents relative position of the wiper arm 52 between lower and upper ends of the element 51. In the operation of the system, the automatic control assembly 42 would maintain the wiper arm 52 of the potentiometer 50 at the lower end thereof in the absence of energization as will be more fully explained in connection with FIG. 3. Accordingly, a direct connection would be provided between the input and output terminals 45 and 46. Any movement of the master member 10 would produce, through the action of the servosystem described, a corresponding movement in the slave member 15. To move the slave member through an automatic cycle of operation independent of the position of the master member, the start switch 58 of control subassembly 57 is actuated. The solenoid of the master lock subassembly 14 locks the master member and the signal appearing at the output of the buffer amplifier 40 is fixed corresponding to the voltage level of point A on the graph of FIG. 2. Also, actuation of start switch 58 causes the motor in control subassembly 57 to move the wiper arm from its start position at the lower end of the potentiometer 50 to the upper end and return. Accordingly, a cycle of operation would be produced in the slave member corresponding to the voltage variations represented in the graph. Point A on the graph corresponds to the lower extremity of resistive element 51, also designated by the letter A on FIG. 1. Point B on the graph corresponds to the point of contact of tap 53 with the resistive element 51 also designated point B on FIG. 1. Point C on the graph corresponds to the point of contact of tap 54 with the resistive element 51 also designated point C on FIG. 1. Point D on the graph corresponds to the upper extremity of resistive element 51 also designated point D on FIG. 1. On return of the wiper arm 52 to its start position, the position of the slave member 15 would be in the same position as when it started, that is in alignment with the master member 10. Concurrently, the master member is unlocked by deenergization of the solenoid of the master lock subassembly 14, and the slave member would then be subject to control by the master member as will be described in detail in connection with FIG. 5.

Figure 3:
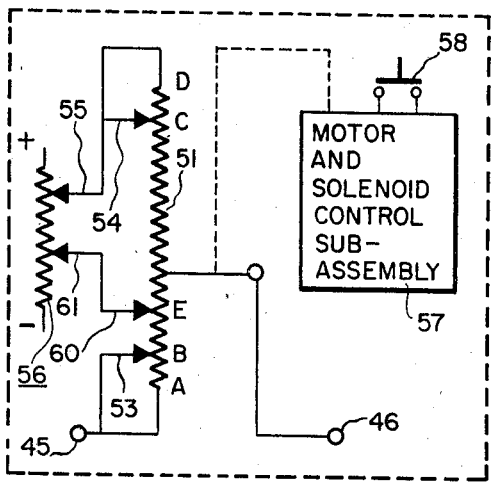
FIG. 3 is a schematic diagram of a modification of the means for developing a single cycle of an electrical signal for automatically driving the slave member.
Figure 4:
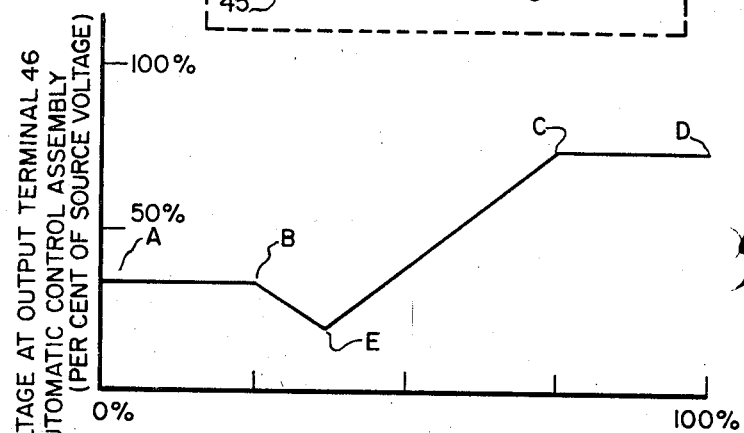
FIG. 4 is a graph of one-half of a cycle of the electrical signal developed by the circuit of FIG. 3.

Reference is now made to FIG. 3 which shows a modification of the potentiometer circuits of the assembly 42 of FIG. 1 to provide a retrograde cycle of operation which is illustrated in the graph of FIG. 4. Elements of FIGS. 1 and 2 identical to elements of FIGS. 3 and 4, respectively, are indicated by the same symbols. The starting and stopping sequences described in connection with FIGS. 1 and 2 are identical for FIGS. 3 and 4. To provide the retrograde motion a tap 60 is located on element 51 at point E between points B and C and is connected to a point 61 on potentiometer 56 which is lower in potential than the potential at the lower end of the resistive element 51. Accordingly, as the wiper arm 52 is moved from point B to point C the voltage drops to a value corresponding to point E on the graph and then rises to point C. The sequence of individual motions can be adjusted by the taps on the rheostat 50 so that the slave boom can be programmed to perform arbitrary complex motions under automatic control and return at the conclusion of the automatic cycle to the starting position as determined by the locked master.

Of course while the system of FIG. 1 shows a single element in the slave member and a single element in the master member, it will be appreciated that links may be connected in series in the master member and in the slave member and each can be controlled by its own servosystem and by its own automatic control circuit and function in the same manner as the system described.

Figure 5:
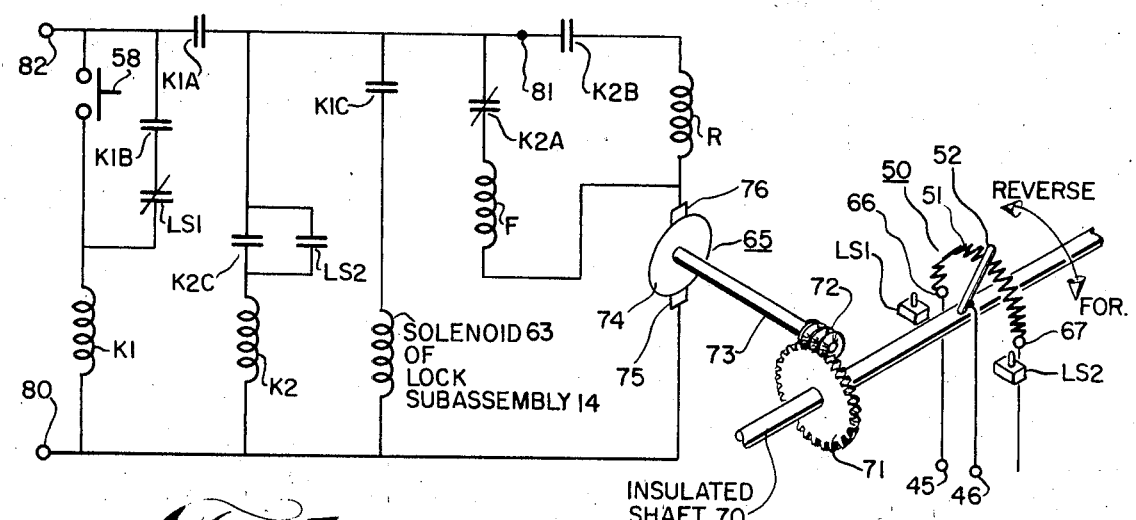
FIG. 5 is a schematic diagram of the motor and solenoid control circuits of FIG. 1.

Reference is now made to FIG. 5 which is a schematic diagram of the motor and solenoid control subassembly 57 of FIG. 1. The elements of FIG. 5 identical to the elements shown in FIG. 1 are designated by the same reference symbol. In response to the actuation of a start switch 58, the circuits of FIG. 5 perform the functions of locking the master member 10 in position by means of a solenoid 63 of master lock subassembly 14 and applying energization to the motor 65 of subassembly 57 to drive the wiper arm 52 of the potentiometer 50 through its cycle of operation from a position at the lower end of the resistive element 51 to the upper end thereof and back to the lower end where power to the motor 65 is shut off and solenoid 63 is deenergized to release the master element 10. The rheostat 50 is shown with the resistive element extending from the lower terminal 66 to the upper terminal 67. At the lower terminal is located a normally closed limit switch LS1 which is open when the wiper arm 52 is in the extreme lower position and a limit switch LS2 normally opened located at the upper terminal of the resistive element and responsive to engagement by the wiper arm to effect closure thereof while so engaged. The wiper arm 52 is connected to an insulated shaft 70, to the other end of which is connected a spur gear 71 driven by a worm gear 72 mechanically coupled to the shaft 73 of a universal motor 65 such, for example, as a series motor. The motor 65 has an armature 74 and a forward winding F and a reverse winding R. One terminal 75 of the armature is connected to a power input terminal 80 and the other armature terminal 76 is connected to one end of the forward winding F and to one end of the reverse winding R. The other end of the forward winding F is connected through normally closed contacts K2A of a relay K2 to point 81. The other terminal of the reverse winding R is connected through normally open contacts K2B to point 81. Point 81 is connected through a pair of normally open contacts K1A of a relay K1 to the other power input terminal 82. The normally open start switch 58 is connected in series with the solenoid of relay K1 between points 80 and 82. The start switch 58 is shunted by a series connection of normally open contacts K1B of relay K1 and the normally closed limit switch LS1. The normally open contacts K2C of relay K2 and the solenoid of the relay K2 are connected in series between the point 81 and point 80. The contacts K2C of relay K2 are shunted by normally open contacts of limit switch LS2. The normally open contacts K1C of relay K1 and the solenoid 63 of the master lock subassembly 14 are connected in series between the point 81 and point 80.

The operation of the circuit of FIG. 5 in connection with the schematic diagram of FIG. 1 is as follows. At the start of a cycle of operation, the wiper arm 52 of the potentiometer 50 is contacting the lower end of the resistive element 51 and maintains the contacts of the limit switch LS1 open. When the start button 58 is actuated, the relay K1 is energized thereby energizing contacts K1A, K1B and K1C. Closure of contacts K1A applies power to the motor 65 through the forward winding thereof causing the motor to move the wiper arm 52 off the limit switch LS1 which closes. The closed contacts of LS1 in conjunction with closed contacts K1B provide a shunt around the start switch 58 which may now be released. Closure of contacts K1C actuates solenoid 63 of the master lock subassembly thereby locking the master member 10 in position. The motor 65 drives the wiper arm 52 from its lower position adjacent terminal 66 to its upper position adjacent terminal 67 where it actuates the limit switch LS2 causing relay K2 to be actuated and accordingly contacts K2A to be opened and K2B and K2C to be closed. Accordingly, the forward winding F is deenergized and its reverse winding R is energized. The motor 65 reverses in direction and moves the wiper arm in the reverse direction toward the lower end of the potentiometer. When the wiper arm reaches the lower end, the normally closed limit switch LS1 is opened removing power to the relay K1, thereby removing power to the motor 65 and from the solenoid 63 of the master lock assembly thereby returning the apparatus of FIG. 1 to manually operable conditions.

While I have shown particular embodiments of my invention, it will of course be understood that I do not wish to be limited thereto since many modifications may be made in the structural arrangement shown and in the instrumentalities employed. I contemplate by the appended claims to cover any such modifications as fall within the true spirit and scope of my invention.

What I claim as new and desire to secure by Letters Patent of the United States is:

1. A control system comprising
   a master member having an axis aligned coaxial with a predetermined axis,
   a master electromechanical transducer mechanically coupled to said master member to produce a first electrical signal in accordance with a change orientation of the axis of said master member in relation to said predetermined axis,
   a slave member having another axis aligned coaxial with another predetermined axis corresponding to said one predetermined axis,
   a slave electromechanical transducer mechanically coupled to said slave member to produce a second electrical signal in accordance with a change in orientation of the axis of said slave member in relation to said other predetermined axis,
   the first signal from said slave transducer being matched to the second signal of said master transducer so that the first signal from said master transducer corresponding to a predetermined displacement of the axis of said master member from said one predetermined axis is equal to the second signal from said slave transducer corresponding to the same predetermined displacement of the axis of the slave member from said other predetermined axis,
   a signal amplification channel and a slave actuator for moving said slave member in response to the output from said signal amplification channel,
   means for differentially combining said first and second signals from said transducers and applying the combined signal to the input of said signal amplification channel,
   said amplification channel developing an output in response to said combined signal for actuating said slave actuator to maintain the axis of said slave member in alignment with the axis of said master member,
   means for developing one cycle of a third electrical signal,
   means for additively combining said first signal and said third signal,
   whereby while said master member is maintained fixed said slave member moves in a cycle of operation corresponding to said one cycle of said third signal and returns to a position of alignment with said master member.

2. The combination of claim 1 in which said third electrical signal is zero at the start and finish of said one cycle.

3. The combination of claim 1 in which said means for developing a third electrical signal is a potentiometer which is electrically actuated to develop a cyclical electrical output.

4. The combination of claim 1 in which are provided means for locking the position of said master member when said third signal is additively combined with said first signal and for unlocking said master member after termination of one cycle of said third signal.

* * * * *